United States Patent
Peters et al.

(10) Patent No.: US 9,174,374 B2
(45) Date of Patent: Nov. 3, 2015

(54) PLUNGER ASSEMBLY SYSTEM

(75) Inventors: Hendrikus Johannes Bernardus Peters, Didam (NL); Henricus Hermanus Johannes Van Londen, Didam (NL)

(73) Assignee: Besi Netherlands B.V., Duiven (NL)

( * ) Notice: Subject to any disclaimer, the term of this patent is extended or adjusted under 35 U.S.C. 154(b) by 1833 days.

(21) Appl. No.: 11/578,873

(22) PCT Filed: Apr. 21, 2005

(86) PCT No.: PCT/NL2005/000294
§ 371 (c)(1),
(2), (4) Date: Aug. 13, 2007

(87) PCT Pub. No.: WO2005/102658
PCT Pub. Date: Nov. 3, 2005

(65) Prior Publication Data
US 2010/0230855 A1 Sep. 16, 2010

(30) Foreign Application Priority Data
Apr. 22, 2004 (NL) .................................... 1026000

(51) Int. Cl.
*B29C 45/14* (2006.01)
*B29C 45/58* (2006.01)

(52) U.S. Cl.
CPC .................................... *B29C 45/586* (2013.01)

(58) Field of Classification Search
None
See application file for complete search history.

(56) References Cited

U.S. PATENT DOCUMENTS 6,200,504 B1 * 3/2001 Peters ............................ 264/39

FOREIGN PATENT DOCUMENTS

| DE | 3811798 | | 10/1989 |
|----|---------|---|---------|
| DE | 4008901 | | 5/1991 |
| EP | 0181086 | | 5/1986 |
| EP | 0645205 | | 3/1995 |
| EP | 0711647 | | 5/1996 |
| JP | 60010630 | | 1/1985 |
| JP | 63019217 | * | 1/1988 |
| JP | 63041035 | * | 2/1988 |
| JP | 04112016 | * | 4/1992 |
| JP | 07124988 | * | 5/1995 |
| JP | 11320601 | | 11/1999 |
| JP | 2009279844 | * | 12/2009 |

* cited by examiner

*Primary Examiner* — Edmund Lee
(74) *Attorney, Agent, or Firm* — The Webb Law Firm

(57) ABSTRACT

The invention relates to a plunger for feeding encapsulating material to a mould cavity, comprising at least one peripheral groove recessed into the cylinder casing of the plunger whereby a material part is placed in the groove which only partly fills the groove. The invention also related to a device for encapsulating electronic components mounted on a carrier. In addition, the invention also relates to a method for sealing a fitting of a plunger housing, which plunger is adapted to feed encapsulating material under pressure to a mould cavity.

9 Claims, 3 Drawing Sheets

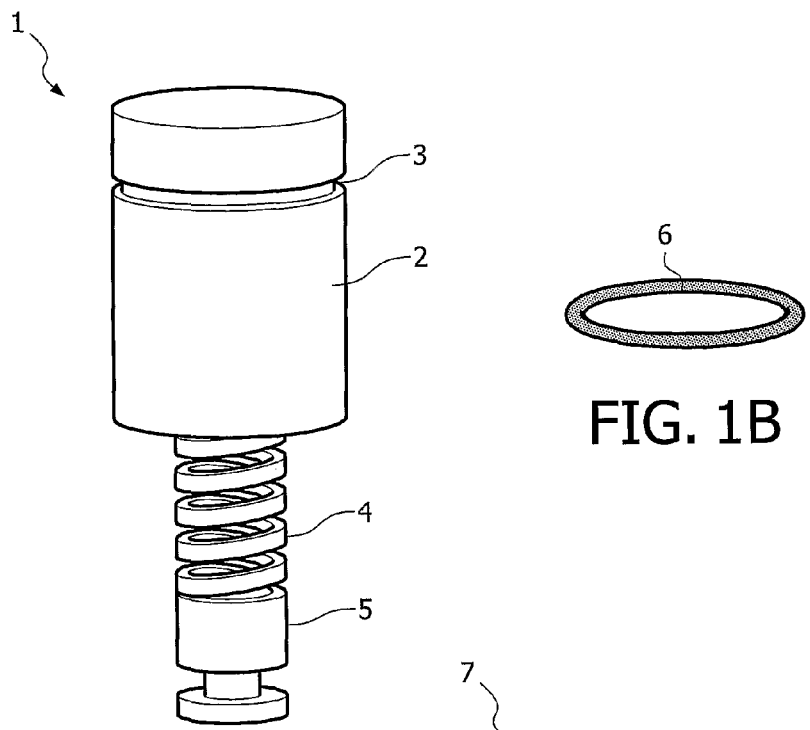
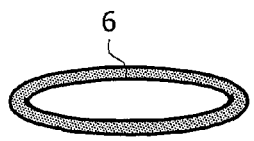
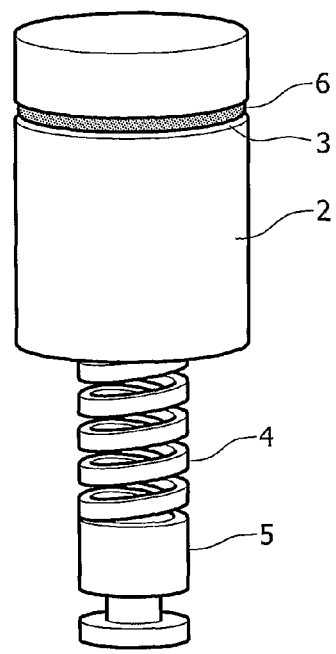
FIG. 1A
FIG. 1B
FIG. 1C

PLUNGER ASSEMBLY SYSTEM

BACKGROUND OF THE INVENTION

1) Field of the Invention

The invention relates to a plunger for feeding encapsulating material to a mould cavity. The invention also relates to a device for encapsulating electronic components mounted on a carrier. In addition, the invention also relates to a method for sealing a fitting of a plunger on a plunger housing, which plunger is adapted to feed encapsulating material under pressure to a mould cavity.

2) Description of the Related Art

In the encapsulation of electronic components, more particularly the encapsulation of semiconductors mounted on a carrier (lead frame), use is made of the so-called "transfer moulding process". The carrier with electronic components is herein clamped between two mould parts such that mould cavities are defined around the components for encapsulating. Liquid encapsulating material is then introduced into these mould cavities and, after at least partial curing thereof, the mould parts are moved apart and the carrier with encapsulated electronic components is removed. The feed of encapsulating material takes place by means of one or more plungers with which pressure can be exerted on a supply of encapsulating material provided for this purpose. These plungers are displaceable in a housing into which the not yet liquid encapsulating material is also carried. The plunger exerts a pressure on the encapsulating material which is heated simultaneously and/or beforehand, as a result of which the encapsulating material becomes liquid. As a response to the pressure applied by the plunger, the liquid encapsulating material flows to the mould cavity and, under the correct processing conditions, fills it completely with encapsulating material. In the displacing of encapsulating material with a plunger the fitting of the plunger on the plunger housing is critical; uncontrollable quantities of encapsulating material must be prevented from penetrating through this fitting. In an existing solution for regulating the fitting of the plunger on the plunger housing a peripheral groove is recessed into the cylinder casing of the plunger. Encapsulating material collects in this groove which then cures and thus functions as seal in a subsequent production step. This is described for instance in U.S. Pat. No. 6,200,504. It has been found in practice that such a seal made from encapsulating material functions well initially, but that after a time there is a danger of the plunger jamming in the housing. This means that the plunger engages on the plunger housing in (too) close-fitting manner via the seal made from encapsulating material.

The present invention has for its object to provide an improved plunger, encapsulating device and method whereby the advantages of the above-described prior art can be retained and the chance of the plunger jamming in the plunger housing can be reduced.

SUMMARY OF THE INVENTION

The invention provides for this purpose a plunger assembly for feeding encapsulating material to a mould cavity. The groove and the material part are herein preferably dimensioned such that the periphery of the groove is filled with encapsulating material forming the seal on the plunger casing by encapsulating material. After a first use of such a plunger the material part placed in the groove is enclosed by encapsulating material. This encapsulating material enclosing the material part will usually cure after a time. It is thus possible to produce a seal with a characteristic of the active surface which is defined by the encapsulating material and a spring characteristic which differs from the spring characteristic of (cured) encapsulating material. The advantageous replenishment of the size of the seal during use of the plunger by newly supplied encapsulating material also remains possible. A good fitting of the plunger on the housing can thus be realized without this possibly resulting after some use in a plunger jamming in its housing as according to the prior art. The reason herefor is that in the sealing which forms in the casing of the plunger according to the surface characteristics of the encapsulating material are combined with a controllable resilient action of such a seal, even after a relatively long period of use. The outside of the seal which forms on the periphery of the plunger casing is formed by encapsulating material (more specifically epoxy), while a core of the seal (the material part accommodated in the groove in the plunger casing) consists of another material. The preventive and remedial maintenance which takes place according to the prior art by removing from the groove a sealing ring of cured encapsulating material does not have to take place, or at least has to be done less frequently. The seal in the plunger according to the invention can retain a sufficient flexibility even after prolonged use (in practice more than about half a day) because of the additional flexibility the material part imparts to the whole seal, this being particularly the case when a material part is used which is manufactured from an elastomer. The frictional resistance which the seal made of encapsulating material exerts on a housing will therefore not (or less quickly) reach extremely high values which impede proper operation of the plunger.

In a preferred embodiment, the material part is manufactured from a plastic. Plastic is available with varying spring characteristics and can furthermore be given a temperature-resistant form. It is thus desirable if the material part is heat-resistant up to a temperature of at least 120° C., preferably a temperature of at least 140° C., more preferably a temperature of at least 160° C. These are after all temperatures which can occur during the encapsulation of electronic components. More specifically envisaged is a material part manufactured from so-called high performance engineering polymers. Examples hereof are: perfluoroalkoxy polymer (PFA), polytetrafluorethylene (PTFE), polyetherether ketone (PEEK), and (fluoro)silicones. Such materials are commercially available under the brand names of, among others, Teflon, Norglide, Fluoroloy, Rulon, Meldin, and Chemraz. It is however also possible for other elastomers with temperature and pressure resistance to be applied for the manufacture of the material part. Another possibility is to manufacture the material part from a material with a relatively high coefficient of expansion. An example of such a material are for instance copper alloys. With such a material part a biasing force can be exerted by the material part during use of the plunger (at an operating temperature in the order of magnitude of 175° C.), which enhances a good sealing.

For an efficient feed of encapsulating material to the groove, in a preferred variant this latter connects via at least one channel arranged in the cylinder casing to the end surface of the plunger to be directed toward the encapsulating material. A constant feed of encapsulating material to the seal can thus be obtained. In a simple but efficient form the material part takes an annular form, for instance as an O-ring. Such rings are commercially available in many variations for other applications.

The invention also provides a device for encapsulating electronic components mounted on a carrier comprising: moulds parts which are displaceable relative to each other and which in a closed position define at least one mould cavity for enclosing an electronic component. Such an encapsulating device can be obtained in simple manner by replacing the existing plungers of a transfer mechanism with the plungers according to the present invention. This means that the advantages of the invention as described above can not only be realized in newly built encapsulating devices, but that existing encapsulating equipment can also be modified in simple manner and with limited investment.

The invention furthermore provides a method for sealing a fitting of a plunger on a plunger housing. This method requires no special provisions other than the placing of the material part in the groove. The subsequent treatment process for encapsulating components by applying the present invention is not affected (with the exception of the durable and improved sealing of the plungers in their housings) when compared to the encapsulation of components according to the prior art.

Placing of the material part can be performed in simple manner by placing an over-dimensioned object at least partly in the peripheral groove during processing step A) and subsequently removing a part of the over-dimensioned object. This removal of a part of the over-dimensioned object can take place by making use of a reference die. More in particular the plunger with the over-dimensioned object can be carried through a reference die, whereby a part of the over-dimensioned object is removed (cut off) from the material part remaining in the peripheral groove. For a further simplification of the placing thereof, the material part can be arranged in the peripheral groove recessed into the plunger casing using a guide (for instance in the form of a hollow mandrel over which the material part is pushed). This is particularly advantageous if use is made of annular material parts. Elastomer bodies of standard dimensions can thus be made to fit in simple manner for co-action with the plunger according to the invention.

BRIEF DESCRIPTION OF THE DRAWINGS

The invention is further elucidated on the basis of the non-limitative exemplary embodiments shown in the following figures. Herein:

FIG. 1A shows a perspective view of a plunger with a peripheral groove recessed into the cylinder casing of the plunger, FIG. 1B shows a view of an annular material part, FIG. 1C is a perspective view of the plunger shown in FIG. 1A with a ring as shown in FIG. 1B placed in the groove.

DETAILED DESCRIPTION OF THE PREFERRED EMBODIMENTS

Figure 1D:
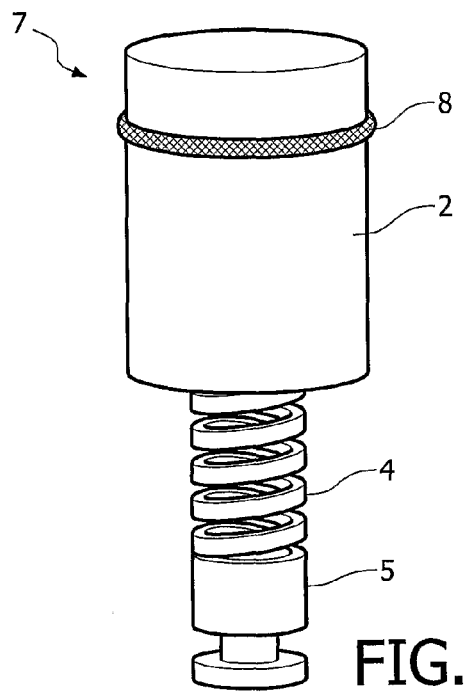
FIG. 1D is a perspective view of the plunger shown in FIGS. 1A and 1C provided with encapsulating material cured in the groove.

FIG. 1A shows a plunger 1 with a cylindrical casing 2 into which a peripheral groove 3 is recessed. Plunger 1 is also provided with a spring 4 for controlling the forces to be exerted with plunger 1. Plunger 1 is also provided with a coupling part 5 with which plunger 1 can be connected to a drive mechanism (not shown) of an encapsulating device. FIG. 1B shows a ring 6 with a diameter which at least substantially corresponds with the diameter of groove 3 recessed into casing 2 of the plunger 1 shown in the previous figure. FIG. 1C shows the assembly 7 of plunger 1 and ring 6. It can be seen here that ring 6 fits closely into groove 3 and that groove 3 is not completely filled by ring 6. The assembly 7 of plunger 1 and ring 6 is also shown in FIG. 1D, although ring 6 is completely hidden from view in this figure because it is covered with cured encapsulating material 8. The cured encapsulating material is partly situated in groove 3, likewise not visible in this figure, in plunger casing 2, but also protrudes to a limited extent above the surface of plunger casing 2. The cured encapsulating material 8 forms a connection to the surface of a housing shown in the following figures in which the assembly of plunger 1 and ring 6 is moved.

Figure 2:
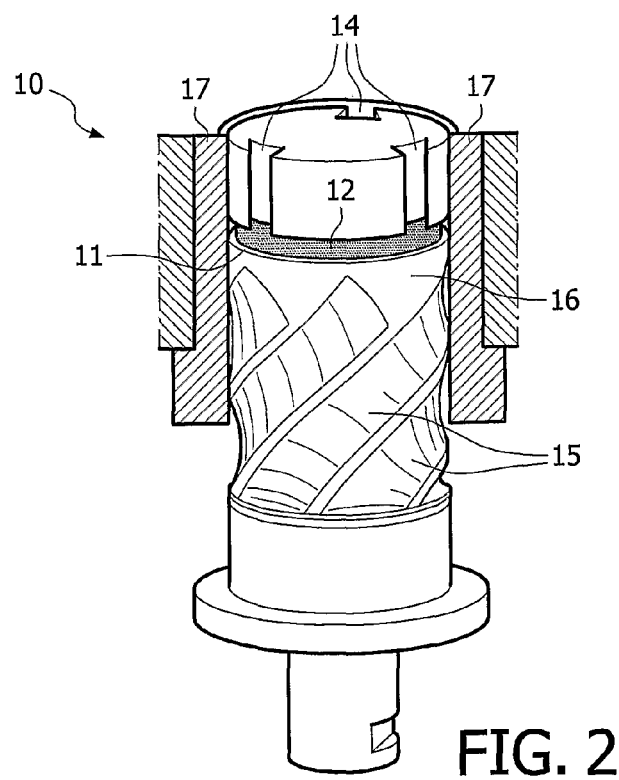
FIG. 2 shows a perspective view of an alternative embodiment variant of a plunger with a peripheral groove which is recessed into the cylinder casing of the plunger and which is partly filled with flexible material.

FIG. 2 shows an alternative embodiment variant of a plunger 10 in which a peripheral groove 11 is once again arranged. Provided in groove 11 is a flexible material layer 12 which in this variant is not formed by a separate ring but by a material layer 12 applied to the bottom of groove 11 (for instance in the form of a liquid, partly curing material layer or a single or multiple layer of tape). Other than in the foregoing figures, there are also provided channels 14 which connect the end surface 13 of plunger 10 to groove 11. The feed of (liquid) encapsulating material to groove 11 can thus be simplified. FIG. 2 also shows helical grooves 15 in cylinder wall 16 with which possible fouling can be scraped off a plunger housing 17 enclosing the plunger 10. The layer of cured encapsulating material with which the material layer 12 will be covered during use of plunger 10 is not yet present in this figure.

Figure 3:
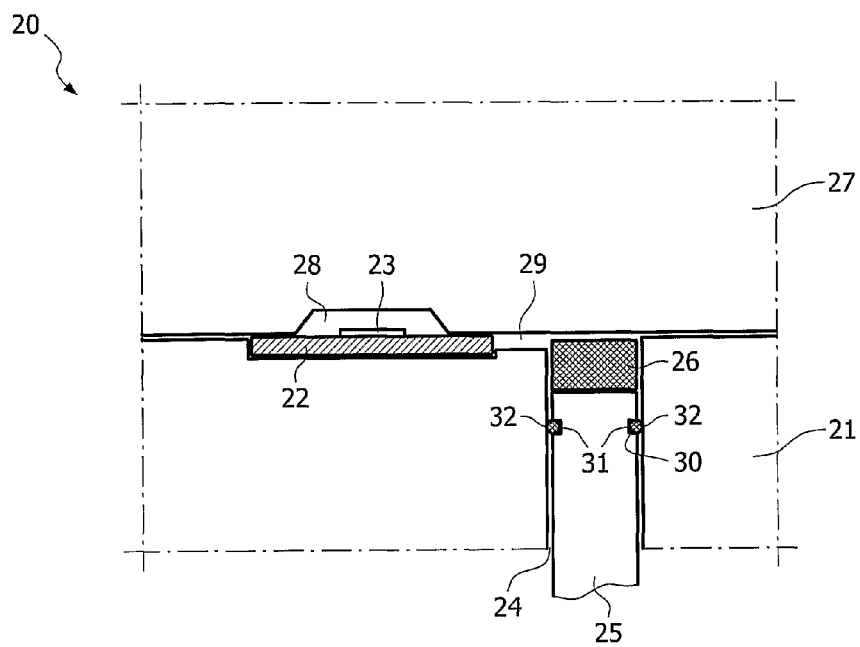
FIG. 3 shows a cross section through a schematic representation of an encapsulating device according to the invention.

FIG. 3 shows an encapsulating device 20 with a lower mould part 21 on which is placed a carrier 22 with an electronic component 23. In lower mould part 21 a receiving space 24 is also left clear for a plunger 25 with which a pellet of encapsulating material 26 (which has usually become liquid under the influence of heat) is brought under pressure. An upper mould part 27 displaceable relative to lower mould part 21 defines a mould cavity 28 around the electronic component 23 for encapsulating, and mould parts 21, 27 together also define a channel 29 through which the liquid encapsulating material 26 pushed up by plunger 25 is guided to mould cavity 28. In the casing of plunger 25 there is arranged a groove 30 in which is placed a flexible ring 31 over which a layer of cured encapsulating material 32 is then deposited. The layer of cured encapsulating material 32 forms a seal on the receiving space 24 for plunger 21 left clear in lower mould part 21.

Figures 4A, 4B, 4C:
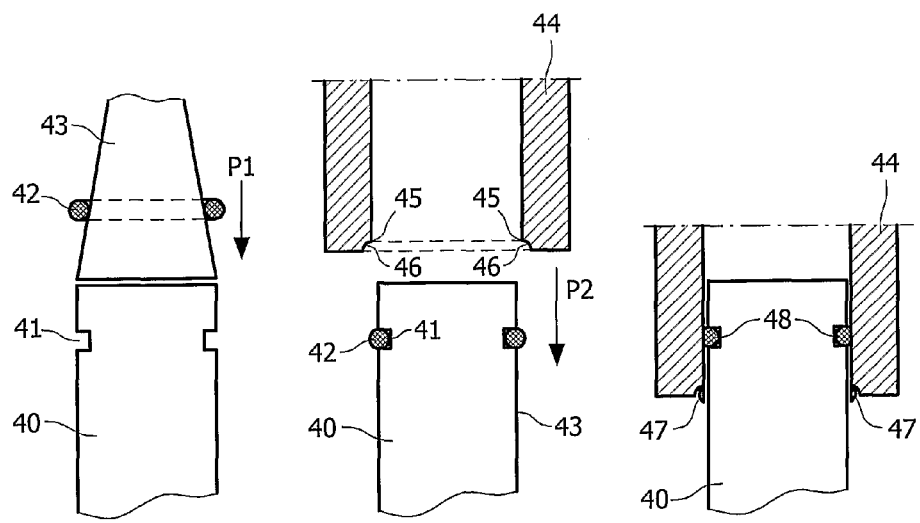
FIG. 4A shows a schematic representation of the fixing of a material part in a groove of a plunger.
FIGS. 4B and 4C show schematic views of successive processing steps of reducing the size of a material part placed in a groove of a plunger.

FIG. 4A shows a plunger 40 with a groove 41 in which a close-fitting ring 42 must be placed. A tapering guide element 43 is provided for this purpose. This guide element 43 makes it possible to place ring 42 in groove 41 as according to arrow P1 in simple manner and without damage to ring 42.

FIGS. 4B and 4C show plunger 40 with the ring 42 placed in groove 41. Ring 42 protrudes outside cylinder casing 43 of plunger 40. Since the ring 42 is too large in this form, it must be made smaller. This can be done by means of a cutting tool 44. A recess 46 is provided in cutting tool 44 close to a cutting edge 45 for the purpose of stabilizing the ring 42 before and during carrying out of the cutting operation. After displacing cutting tool 44 relative to plunger 40 as according to arrow P2, an excess portion 47 of ring 42 will be cut off, as shown in FIG. 4C, such that a remaining part 48 having the desired dimensions is left in groove 41.

The invention claimed is:

1. A plunger assembly system for feeding encapsulating material to a mold cavity, the plunger assembly comprising:
    a cylindrical casing including a peripheral groove;
    a material part disposed in the bottom of the groove; and
    encapsulating material surrounding an outer periphery of the material part.

2. The plunger assembly system of claim 1, wherein the material part is a flexible ring.

3. The plunger assembly system of claim 2, wherein the ring is an O-ring.

4. The plunger assembly system of claim 1, wherein the material part is annular.

5. The plunger assembly system of claim 1, further including a channel in the cylindrical casing between the groove and an end surface of the cylindrical casing.

6. The plunger assembly system of claim 5, wherein the channel is in an exterior surface of the cylindrical casing.

7. The plunger assembly system of claim 1, wherein, in use of the plunger assembly, the encapsulating material is between the material part and a housing in which the cylindrical casing moves.

8. The plunger assembly system of claim 1, wherein the material part is manufactured from a plastic.

9. The plunger assembly system of claim 1, wherein the encapsulating material is partially situated in the groove.

* * * * *